United States Patent [19]

Katsumori et al.

[11] 4,262,779

[45] Apr. 21, 1981

[54] SHOCK ABSORBER WITH RESERVOIR AND WORKING CHAMBER COMMUNICATING STRUCTURE

[75] Inventors: Teiji Katsumori; Shinji Yokoyama; Tetuo Kato, all of Kawasaki, Japan

[73] Assignee: Tokico Ltd., Japan

[21] Appl. No.: 830,875

[22] Filed: Sep. 6, 1977

Related U.S. Application Data

[63] Continuation of Ser. No. 674,970, Apr. 8, 1976, abandoned, which is a continuation of Ser. No. 594,041, Jul. 8, 1975, abandoned, which is a continuation of Ser. No. 396,535, Sep. 12, 1973, abandoned.

[30] Foreign Application Priority Data

Sep. 12, 1972 [JP] Japan .................................. 47-91523

[51] Int. Cl.$^3$ .............................................. F16F 9/06
[52] U.S. Cl. .................................... 188/315; 188/269; 267/8 R
[58] Field of Search ............. 267/64 R, 8 R; 188/286, 188/287, 269, 315

[56] References Cited

U.S. PATENT DOCUMENTS

| | | | |
|---|---|---|---|
| 1,455,265 | 5/1923 | Rabb | 188/287 |
| 2,974,946 | 3/1961 | Tuczek | 267/64 R |
| 3,661,236 | 5/1972 | Wossner | 188/315 |

*Primary Examiner*—George E. A. Halvosa
*Attorney, Agent, or Firm*—Holman & Stern

[57] ABSTRACT

A shock absorber and suspension strut unit having an outer cylinder containing a predetermined amount of a damping liquid. An inner cylinder is mounted rigidly and concentrically in the outer cylinder and is arranged so as to form an intermediate concentric space between the cylinders. A movable piston rod assembly is movable relative to the double-cylinder assembly and has a piston slidably arranged within the inner cylinder for movement therealong. Check valves are provided in the piston for permitting selective fluid flow from one side of the piston to the other. Further, one or more communication passages are provided in an end of the inner cylinder which abuts the enclosed and the outer cylinder for allowing fluid passage therethrough mutually between a liquid chamber formed below the piston within the inner cylinder and lower part of the annular space formed by and between the cylinders. Thus, these spaces are a substantially unified liquid chamber. A first gas-filled chamber formed at the upper part of the further liquid chamber above the piston within the inner cylinder, while a second gas-filled chamber is formed at the upper part of the annular space. The resulting unit is characterized by the first and second gas-filled chambers being so arranged that either one of them is caused to expand during the contracting or expanding stroke of the unit, while the remaining one of the chambers is caused to simultaneously contract. A fluid flow-limiting passage is provided through the wall of the inner cylinder for allowing free fluid flow passage between the two gas-filled chambers.

1 Claim, 4 Drawing Figures

FIG. 1
FIG. 2a
FIG. 2b
FIG. 3
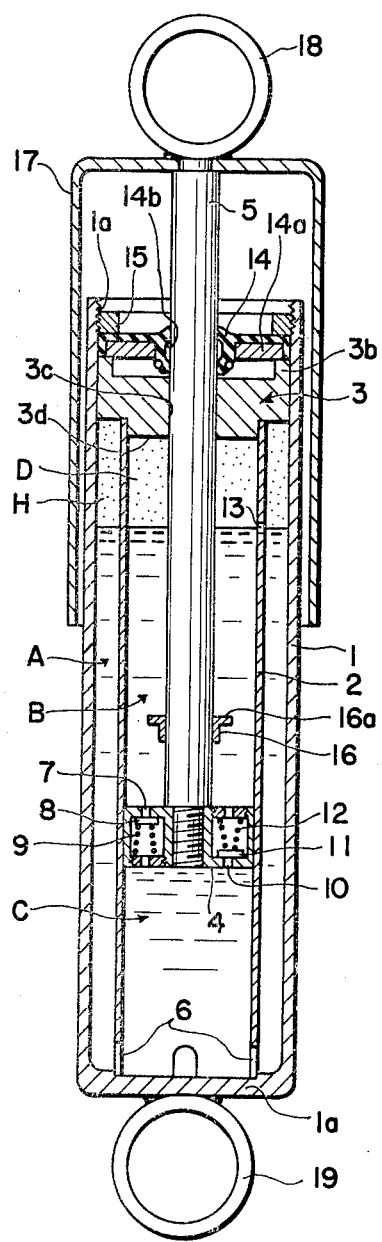
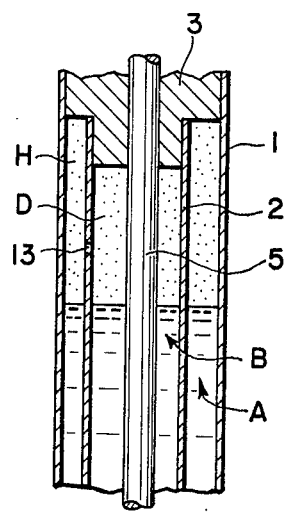
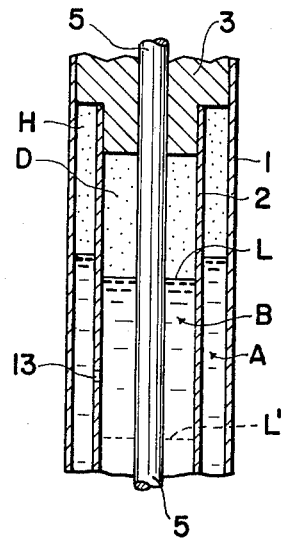
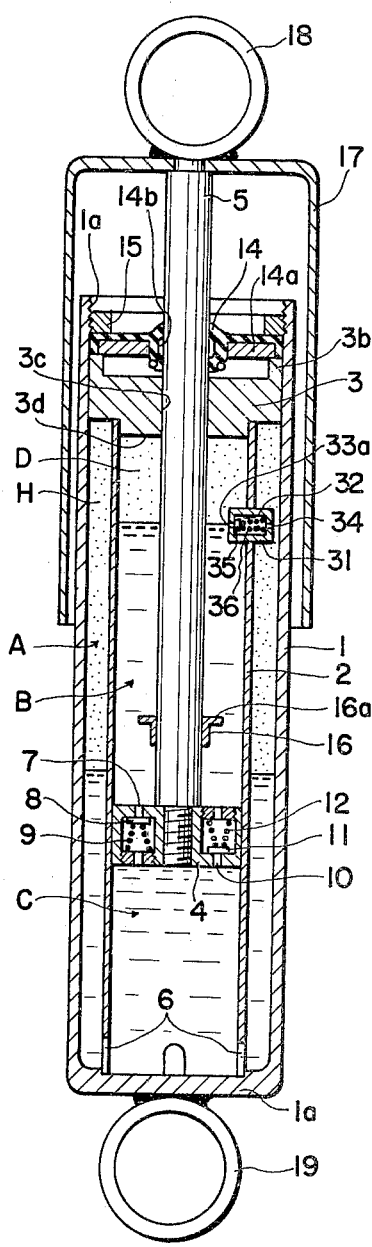

SHOCK ABSORBER WITH RESERVOIR AND WORKING CHAMBER COMMUNICATING STRUCTURE

This is a continuation of application Ser. No. 674,970 filed Apr. 8, 1976 which in turn is a Continuation of Ser. No. 594,041 filed July 8, 1975 which in turn is a Continuation of Ser. No. 396,535, filed Sept. 12, 1973, all of which are now abandoned.

BACKGROUND OF THE INVENTION

This invention relates to improvements in and relating to shock absorbers and suspension struts adapted for use with powered and wheeled vehicles, especially those for automotive vehicles.

This invention starts from such a shock absorber or suspension strut unit which comprises an outer cylinder and an inner cylinder concentrically and rigidly arranged with each other, and utilizes gas and liquid in combination as its working or damping fluids, there being provided two gas chambers formed and maintained within the unit.

In such kind of damping unit, it has frequently been experienced that one of these gas spaces will disappear upon extended service period of the unit caused by an unintentional shift of the gas medium from one to the other gas chamber within the unit.

SUMMARY OF THE INVENTION

The main object of the present invention is to obviate such trouble as being caused by an unintentional transfer of the gas in the above mentioned manner.

It is a further object of the present invention to provide unique means adapted for automatic control of the gas volumes to be kept in the respective gas chambers.

It has hitherto been proposed to provide two mutually cooperating damping gas chambers responsive to the up-and-down movement of the damping piston in the pneumatically and hydraulically operating shock absorber or suspension strut unit. The superior feature of this kind of vibration damping unit resides in that the higher the number of vibrations of the vehicle at constant piston speed, the smaller will become the generated damping force and the spring constant of the unit will become the larger, which constitutes a substantial advantage.

Without the use of the free piston type or diaphragm separator for separating the gas and liquid contained in the unit, gas may frequently transfer from one to the other of these two gas chambers, especially upon execution of long extended service by the unit.

As will become more apparent, these disadvantages can be effectively eliminated by use of simple mechanism, as will become clear as the description proceeds.

BRIEF DESCRIPTION OF THE DRAWINGS

These and further objects, features and advantages of the present invention will become more apparent when the following description of the invention is read with reference to the accompanying drawings in which:

FIG. 1 is substantially an axially sectional view of a first embodiment of the present invention.

FIGS. 2a and 2b are detailed and partial views of essential and slightly modified parts of the first embodiment shown in FIG. 1.

FIG. 3 is a similar view to FIG. 1, illustrative of a second embodiment.

DESCRIPTION OF THE PREFERRED EMBODIMENTS

Referring to the accompanying drawings, preferred embodiments of the present invention will be described in detail.

In FIG. 1, numeral 1 represents an outer cylinder having closed bottom 1a. An inner cylinder 2 is fixed to and concentrically attached to the outer cylinder, a ring-shaped space "A" being formed therebetween.

Numeral 3 represents a rod guide which closes the upper end portions of the outer and inner cylinders 1 and 2, having its small and large diameter portions 3a and 3b adapted for engagement with respective bores the latter and former cylinders, respectively as shown, thereby providing substantially the main body of the apparatus according to this invention.

In the bore of inner cylinder 2 of the main body, there is provided at its upper end part with a damping gas space "D" filled with preferably air, the remainder of the inner cylinder bore being filled with damping liquid, preferably oil, so as to form a liquid chamber "G". In the similar way, the upper end part of the ring space formed between the outer and inner cylinders 1 and 2 constitutes a gas chamber "H", while the remainder provides a liquid chamber "A".

Numeral 4 represents a damping piston which is slidably mounted in the bore of inner cylinder 2, thereby the liquid space thereof being divided into an upper liquid chamber "B" and a lower liquid chamber "C" having respective variable effective volumes depending upon the occasional position of the piston, as will be more fully described hereinafter. The piston 4 is fixedly attached to the lower end of a piston rod 5 passing through the upper liquid chamber "B" and an axial bore 3c formed through rod guide 3 which piston rod extends further upwardly through the upper part of said main body, as shown. In this way, the main body is formed therein with gas chambers "D" and "H" and oil chambers "A", "B" and "C".

At the lower end region of the wall of inner cylinder 2, there are provided a plurality of communication passages 6 for free liquid communication between liquid chambers "A" and "C", thus these liquid chambers constituting a single unified chamber in effect.

Numeral 7 is a flow-limiting passage formed through the piston 4 for allowing fluid pass from the upper liquid chamber "B" to lower liquid chamber "C" and provided for this purpose with a check valve 8 backed-up from below by a valve spring 9 contained within an intermediate enlarged portion of the passage 7. Numeral 10 is again a flow-limiting passage formed through the same piston 4 for allowing fluid pass from the lower liquid chamber "C" to upper liquid chamber "B" and provided for this purpose with a check valve 11 backed-up from upper by a valve spring 12 contained within an intermediate enlarged portion of the passage 10. As may be easily seen, passage 7, check valve 8 and valve spring 9 constitute in combination a damping force-generating means for limiting oil flow through the passage 7 when the shock absorber is caused to expand, as will be more fully described hereinafter, as known per se. In the similar way, passage 10, check valve 11 and valve spring 12 constitute in combination a damping force-generating means by limiting oil flow through the passage 10 when the shock absorber is caused to contract, as known per se. These passages 7 and 10 are kept in their closed position by the respective check valves 8 and 11 when the shock absorber is stationary, as shown. These damping force-generating means may be substituted by orifices, disk valves or the like known equivalent means, if necessary, although not specifically shown.

One or more communication passages or orifices 13 are formed through the upper part of the wall of inner cylinder 2 for allowing fluid communication between the chambers "B" and "A". The position of these orifices 13 is so selected that in case of the shock absorber unit according to this invention held in its neutral position as shown, they are situated at the critical point defining the critical region between the chambers "D" and "B" and between the chambers "H" and "A". Thus, the free liquid surfaces of the oil contained in the chambers "A" and "B" are positioned at a common horizontal level when the shock absorber unit is positioned at its truely vertical position and is not subjected to any movement of the piston-rod assembly 4;5 relative to the main body, as may be caused to vibration of the chassis, not shown, or of the running gear, not shown, of an automotive vehicle fitted with several vibration damper units of the above kind.

Numeral 14 represents a centrally perforated sealing disk which has a back-up ring 14a and is inserted sealingly at the upper end portion of the outer cylinder 1 for prevention of any escapement of working gas and/or liquid contained in the main body towards outside thereof. The central perforation 14b of the sealing disk 14 seals the reciprocatable piston rod 5 for prevention of fluid leakage from the interior of the main body towards outside thereof along the outer surface of the piston rod.

The sealing assembly 14; 14a is held in position as shown in FIG. 1 by tightening a lock ring 15 against the upper surface of rod guide 3 which ring engages with female threads 1a formed at the upper end region of outer cylinder 1. In this way, the seal 14, rod guide 3 and inner cylinder 2 are fixedly attached to the outer cylinder 1.

A stop member 16 is fixedly attached by welding or the like conventional attaching means to the piston rod 5 at a slightly upper level above the piston 4, the upper surface 16a of the stop being adapted for engagement with the lowermost surface 3d of rod guide 3 when the piston-rod assembly 4; 5 is moved upwardly relative to the main body of the unit, for limiting the maximum allowable expanding stroke of the latter.

An inverted cup-shaped cover shield 17 is fixedly attached to the upper extending end of the rod proper 5 at which an upper attaching piece 18 formed preferably into a ring as shown is also attached fixedly by welding or the like conventional fixing measure. This attaching piece 18 is attached to the chassis side of an automotive vehicle, although not specifically shown only for simplicity and by virtue of its very popularity.

At the lowermost end of rod 5, a lower attaching piece 19 formed again preferably into a ring as shown is also fixedly attached as by welding or the like conventional measure which piece is fixedly attached to the running gear side of the vehicle, although not shown by virtue of its very popularity.

The operation of the device according to the present invention so far shown and described is as follows:

When the vehicle is stationary, the piston 4 of the device occupies substantially its neutral position within the interior of inner cylinder 2 as shown. Now, it is assumed under these conditions that the volume of gas chamber "D" is denoted by V1, that of the chamber "H" by V2, the pressure prevailing in chambers "D", "B", "C", "A" and "H" by P0 and the crosssectional area of piston rod by Ar, respectively.

When the vehicle runs and the shock absorber should extend by a stroke "S" upon subjected to an up-going vibration stroke, the piston-rod assembly 4; 5 will move upward correspondingly within the interior space of inner cylinder 2. Then, the volume of gas chamber "D" will reduce from V1 to a certain smaller value, say V1′ and the pressure prevailing in the chambers "D" and "B" will increase from P0 to a certain larger value, say, P1. On the other hand, the volume of liquid chamber "C" will increase correspondingly and thus, an amount of liquid equal to the volume: $(Ar \cdot S) + (V1 + V1')$ will be transferred from outer liquid chamber "A" through passage openings 6 to the chamber "C" without restriction, and the volume of outer gas chamber "H" will expand from V2 to a certain larger value V2′ which equals to:

$$V2 + \{(Ar \cdot S) + (V1 - V1')\}$$

Correspondingly, the pressure prevailing in the chambers "A" and "C" will reduce from P0 to a certain lower value, say, P2. Thus, by the presence of this pressure difference, part of oil in the chamber "B" will be caused to flow forcibly through the passage 7 into the chamber "C" by opening the check valve 8 against the action of valve spring 9. At the same time, oil will flow from the chamber "B" through the orifice 13 into the ring liquid chamber "A". During these oil flows, hydraulic damping forces will be generated. In this case, the oil transferred from the chamber "B" through orifice 13 to the chamber "H" will occupy part of either chamber "A" or "H" or the both.

Conversely, when the shock absorber be subjected to effect of a downwardly going vibration stroke and it is caused to contract by a stroke S′ by descending movement of the piston-rod assembly within the interior space of inner cylinder, part of the oil prevailing in the chamber "C" will be transferred through passage openings 6 the ring space "A" without being subjected to restriction. Therefore, the volume of gas chamber "H" will be reduced from V2 to a certain smaller value, say, V2″ and the pressure prevailing among chambers "A" and "C" will increase from P0 to a certain higher value, say, P2′. Since, on the other hand, the volume of oil chamber "B" will increase, the gas chamber "D" will expand from V1 to a certain larger value, say, V1″ corresponding to:

$$V1 + \{(V2 - V2'') - (Ar \cdot S')\}$$

At the same time, the pressure prevailing in the chambers "D" and "B" will reduce from P0 to a certain smaller value, say, P1′. Therefore, a pressure difference: $P2' - P1'$ will be generated between the upper space above piston 4 and the lower space therebelow. By virtue of the presence of this pressure difference, part of oil prevailing in the chamber "C" will forcibly flow through passage 10 to the chamber "B" by opening the check valve 11 against the action of valve spring 12. At the same time, oil will also flow from chamber "A" through orifice 13 into chamber "B". By these oil flows, compressive damping forces will be generated. Oil flowing from the ring space "A" through orifice 13 into chamber "B" will occupy part of either chamber "B" or "D" or of the both.

The foregoing operation is of the basic mode of the shock absorber according to this invention. In this embodiment, the orifice 13 play a damping force-generating means. In addition thereto, the orifice exerts the following important functions.

At first, the function of the orifice 13 during the assembly of the shock absorber unit is as follows. During the assembly job, oil is filled in the space "A" and gas or air is charged in the chamber "B". At this stage, a sole gas chamber "D" will be formed only at an upper part of the interior space of the inner cylinder 2. If there be no orifice at 13, any gas volume would not be available at the upper part of the ring space between the inner and outer cylinders. However, by the very presence of this orifice according to a substantial feature of the present invention, part of gas or air prevailing in the gas chamber "D" will shift therefrom through this orifice to the upper portion of said ring space, thus finally forming the outer and ring-shaped gas chamber "H".

It is now assumed that the shock absorber according to this invention is positioned in the up-and-down inverted way by an accident or during transportation of the unit. Then, the gas prevailing in the chambers "D" and "H" will be transferred to the chamber "B", space "A" and the chamber "C" or the lower parts of the unit. It is further assumed that the inverted unit could recover its regular position, then, the gas will move upwards towards the upper parts of the unit or more specifically towards the upper parts of the ring space, chamber "B" and "C", respectively. When the unit is brought into its operation under these conditions, the gas accumulated at the upper part of chamber "C" will forcibly flow through the flow-limiting passage 10 by forcibly opening the check valve 11 against the action of spring 12 towards the upper portion of the chamber "B". At this stage, a more quantity of the gas will be available in the chamber "D" than "H" and the part of gas occupying a lower position than the orifice 13 will be transferred therethrough to the space "H", thereby establishing a kind of well balanced condition. Therefore, in this way, the gas chambers "D" and "H" are maintained at a mutually well balanced condition by the very presence of the orifice space.

In the conventional comparative shock absorber which has not been formed with the said orifice 13, the disadvantageous aeration phenomenon may frequently occur. When this should take place, part of the operating gas will escape gradually from the chamber "H" through oil chamber "A", passage openings 6, oil chamber "C", check valve mechanism 10–12 and oil chamber "B" into the gas chamber "D". In the present device, however, the mutually well-balanced condition can be positively assured between the both gas chambers "D" and "H" by the said provision of the orifice 13 which may be in plural in its member when occasion may desire.

In a modified embodiment shown in FIG. 2a, the oil levels in the chambers "A" and "B" are situated below the orifice 13, when observed with the neutral position of the piston-rod assembly.

When the shock absorber unit is subjected under these conditions to an expansion stroke, the pressures in the respective oil chambers "A" and "B" will be correspondingly increased. Then, gas in the chamber "D" will flow therefrom through orifice 13 into the space "A", and at the same time, oil will flow from the chamber "B" through the check valve mechanism 7–9 to oil chamber "C". Thus, expansive damping forces will be provided by the limited flows of gas and oil. Then, when the unit is subjected to a further expansion stroke and the oil level within the inner cylinder raises and reaches at the orifice 13. oil will flow from the chamber "B" through the orifice 13 into the space "A". At the same time, oil will flow forcibly through the damping passage 7 upon forcibly opening the related check valve into the lower and central oil chamber "C". Thus, oil damping force is provided at the expansive operation of the unit.

Even in the case of occurence of disadvantageous aeration so that gas will be transferred from "H" to "D", the chamber "D" will maintain always the necessary quantity of gas by the very presence of the orifice 13. The same effect can also be maintained relative to the outer and ring-space "H".

In the case of a further modified operating condition of the present shock absorber, the orifice 13 is situated at a lower level than the oil levels maintained in the main body of the unit. The expansive damping force can be generated in the same way, as was referred to hereinbefore set forth in connection with FIG. 1.

In this case, the unit is assumed to be subjected to a maximum contraction and the oil level in the chamber "B" lowers from L to L' which is situated below the orifice 13. Then, it is further assumed that the unit now expands. At the initial stage of this operation, gas will flow from the chamber "D" through orifice 13 into the space "A" and oil will also escape from chamber "B" through the expansure damping check valve mechanism 7–9 into the chamber "C". With further expansive stroke movement of piston 4, oil will flow from the chamber "B" through said orifice 13 and the said damping check valve mechanism into the chambers "A" and "C", respectively.

Therefore, even if the disadvantageous aeration should take place, and thus gas will be transferred from the chamber "H" to "D", the gas chamber "H" will be always kept at its well balanced operating conditions.

Even with the modified arrangement as shown at FIG. 2a, the oil levels in the unit will be subjected to alteration up-and-down by virtue of the regular damping operations of the damper unit, the orifice 13 is positioned at the critical level between the gas and the liquid contained in the unit.

In a further embodiment shown in FIG. 3, there is provided a gas volume-regulating valve. In this embodiment, same reference numerals show respective same or similar constituent parts of the unit as those used in the foregoing embodiment.

Numeral 31 represents a valve body fixedly attached to the inner cylinder 2 as shown, said valve body being formed therein with an inside valve chamber 32 opening through an orifice passage 33a at the interior space of the inner cylinder 2. The valve body is formed with an outwardly opening passage 34 opening at the ring space between the cylinders 1 and 2. In this way, those members 32, 33a and 34 provide in combination a flow limiting check valve or orifice means acting as similarly to the orifice 13 in its operation and provided between the chambers "B" and "A". There is provided a valve 35 mounted within the valve chamber 32 adapted for on-off control of fluid flow, so as to exclusively allow that in the direction from "B" to "A". 36 represents a valve spring serving for this purpose. The valve chamber 32, valve 35, valve spring 36 and the like contained within valve body 31 constitute in combination a kind of gas volume-adjusting valve mechanism adapted for maintaining the gas volumes in the respective gas chamber "D" and "H" at respective constant values.

The basic operation of the present embodiment is almost the same as that of the first embodiment. The difference resides in that of the gas volume-adjusting mechanism above referred to. When the piston moves upwards, said mechanism operates as the damping force-generating means allowing exclusively fluid flow from the oil chamber "B" to the space "A". On the other hand, when the piston descends, the said mechanism functions to interrupt any fluid flow between the spaces "B" and "A".

However, the said mechanism functions also for the following service.

When the disadvantageous aeration should take place during the operating period of the shock absorber unit and gas should shift from gas chamber "H" through the oil chamber formed at the lower part of the space "A", passage openings 6 into the interior space of inner cylinder 2, thence through the damping force-generating means in the piston 4 and further through oil chamber "B" upwardly into gas space "D" so that the volume of the latter increases, the expansive damping force in the unit will be reduced correspondingly while the compressive damping force thereof may be increased correspondingly, which may result in a disadvantageous effect of the whole mechanism.

Now, when gas should shift from the chamber "H" to gas chamber "D", the oil level in the space "A" will rise while that appearing in the chamber "B" in the inner cylinder will lower. When the unit expands under such a condition that the oil level in "B" is situated at a lower level than the gas volume-adjusting mechanism, gas will be returned at the initial stage of the present operation from gas chamber "D" through the said gas volume-adjusting mechanism to the space "A".

When the unit contracts under the same operating conditions as set forth above, the pressure in the space "A" will become higher than that prevailing in the chamber "B" so that valve 35 is kept in its closed position. Thus, by repeating the above operations, the gas volume in the chamber "D" will be kept at last at a constant value, responsive to the level of the gas volumeadjusting valve mechanism.

Excess accumulation of gas in any of the gas chambers of the unit will be brought about during assembly and/or transport thereof, in addition to the aforementioned aeration phenomenon cases, similar rescue measure can be provided as before.

Aeration in the reverse direction, or more specifically in the direction from the chamber "D" to "H" can be counter measured in the similar manner as above.

The embodiments of the invention in which an exclusive property or privilege is claimed are as follows:

1. In a shock absorber and suspension strut unit comprising: an outer cylinder having a closed bottom; an inner cylinder defining an inner chamber rigidly and concentrically secured to said outer cylinder defining therebetween an annular chamber; a damping liquid partially filling said inner chamber and said annular chamber; a movable piston rod; a movable piston connected to said piston rod slidable within and along said inner cylinder, said piston dividing said inner chamber into an upper chamber and a lower chamber; damping force-generating means provided in and on said piston adapted for acting in each of the expanding and contracting strokes of said piston; communication passage means between said lower chamber and said annular chamber for free flow of said damping liquid therebetween; a rod guide stopper means for sealing the passage of said piston rod and stoppering said inner and outer cylinders; and a gas partially filling said upper chamber and said annular chamber defining a first gas-filled chamber above the liquid in said upper chamber generating a first gas-liquid interface, and a second gas-filled chamber above the liquid in said annular chamber generating a second gas-liquid interface, the improvement comprising: an orifice means through said inner cylinder at a predetermined distance below said rod guide stopper means at said first gas-liquid interface when the unit is in the neutral position for maintaining the permanent existence of both gas-filled chambers, said first gas-liquid interface being maintained at a predetermined level below said rod guide stopper means thereby maintaining a predetermined volume of said gas in said first gas-filled chamber said orifice means being a check valve for allowing fluid flow from said upper chamber to said annular chamber.

* * * * *